US009273814B1

(12) United States Patent
De Los Santos

(10) Patent No.: US 9,273,814 B1
(45) Date of Patent: Mar. 1, 2016

(54) APPARATUS FOR PATCHING NON-LINEAR PIPE SECTIONS AND METHOD OF UTILIZING THE SAME

(71) Applicant: Elias De Los Santos, San Jose, CA (US)

(72) Inventor: Elias De Los Santos, San Jose, CA (US)

(73) Assignee: Innovative Maintenance Products, LLC, San Jose, CA (US)

( * ) Notice: Subject to any disclaimer, the term of this patent is extended or adjusted under 35 U.S.C. 154(b) by 0 days.

(21) Appl. No.: 14/077,000

(22) Filed: Nov. 11, 2013

(51) Int. Cl.
  *F16L 55/16* (2006.01)
  *F16L 55/18* (2006.01)
  *F16L 55/168* (2006.01)

(52) U.S. Cl.
  CPC ............... *F16L 55/18* (2013.01); *F16L 55/168* (2013.01)

(58) Field of Classification Search
  CPC ....... F16L 55/168; F16L 55/17; F16L 55/172; F16L 55/1725; F16L 55/178
  USPC ............................................. 138/99, 112, 159
  See application file for complete search history.

(56) References Cited

U.S. PATENT DOCUMENTS

| | | | | |
|---|---|---|---|---|
| 1,659,196 A * | 2/1928 | Fulton | ............................. | 24/279 |
| 2,002,577 A * | 5/1935 | Ice | .................................. | 138/99 |
| 2,069,722 A * | 2/1937 | Merrill | ............................. | 138/99 |
| 2,074,799 A * | 3/1937 | Merrill | ............................. | 138/99 |
| 2,616,736 A * | 11/1952 | Smith | ........................... | 277/607 |
| 2,690,193 A * | 9/1954 | Smith | ........................... | 138/99 |
| 2,843,155 A * | 7/1958 | Risley et al. | .................... | 138/99 |
| 2,936,186 A * | 5/1960 | Dunmire | ...................... | 285/373 |
| 3,053,282 A * | 9/1962 | Fox | .................................. | 138/99 |
| 3,086,555 A * | 4/1963 | Smith | ........................... | 138/99 |
| 3,692,062 A * | 9/1972 | Dunmire | ...................... | 138/99 |
| 4,381,020 A * | 4/1983 | Daghe et al. | .................... | 138/99 |
| 5,121,946 A * | 6/1992 | Jardine | .......................... | 285/15 |
| 5,247,967 A * | 9/1993 | Bourque | ....................... | 138/99 |
| 5,288,108 A * | 2/1994 | Eskew et al. | .................... | 285/15 |
| 6,675,836 B1 * | 1/2004 | Gaston et al. | .................... | 138/99 |
| 6,896,004 B1 * | 5/2005 | Witzel | ........................... | 138/112 |
| 2004/0035482 A1 * | 2/2004 | Wensel et al. | .................... | 138/89 |
| 2004/0108713 A1 * | 6/2004 | Krausz et al. | .................... | 285/53 |
| 2010/0206417 A1 * | 8/2010 | Wolf et al. | ...................... | 138/99 |
| 2013/0181443 A1 * | 7/2013 | Ho et al. | ....................... | 285/337 |

* cited by examiner

*Primary Examiner* — James Hook
(74) *Attorney, Agent, or Firm* — James M. Duncan, Esq.; Klein DeNatale Goldner

(57) ABSTRACT

A repair apparatus and method is utilized for repairing leaks, ruptures or weaknesses in ell pipe fittings. An arcuate reinforcement structure conforms to the radius of curvature of the convex side of the fitting and a second arcuate reinforcement structure conforms to the curvature of the concave side of the fitting. One or both of the reinforcement structures urges a sealing member against the fitting, with at least one of the sealing members sealing over the leak, rupture, or weakness. The reinforcement structures may have integral bands which may attach to encircle the fitting.

5 Claims, 19 Drawing Sheets

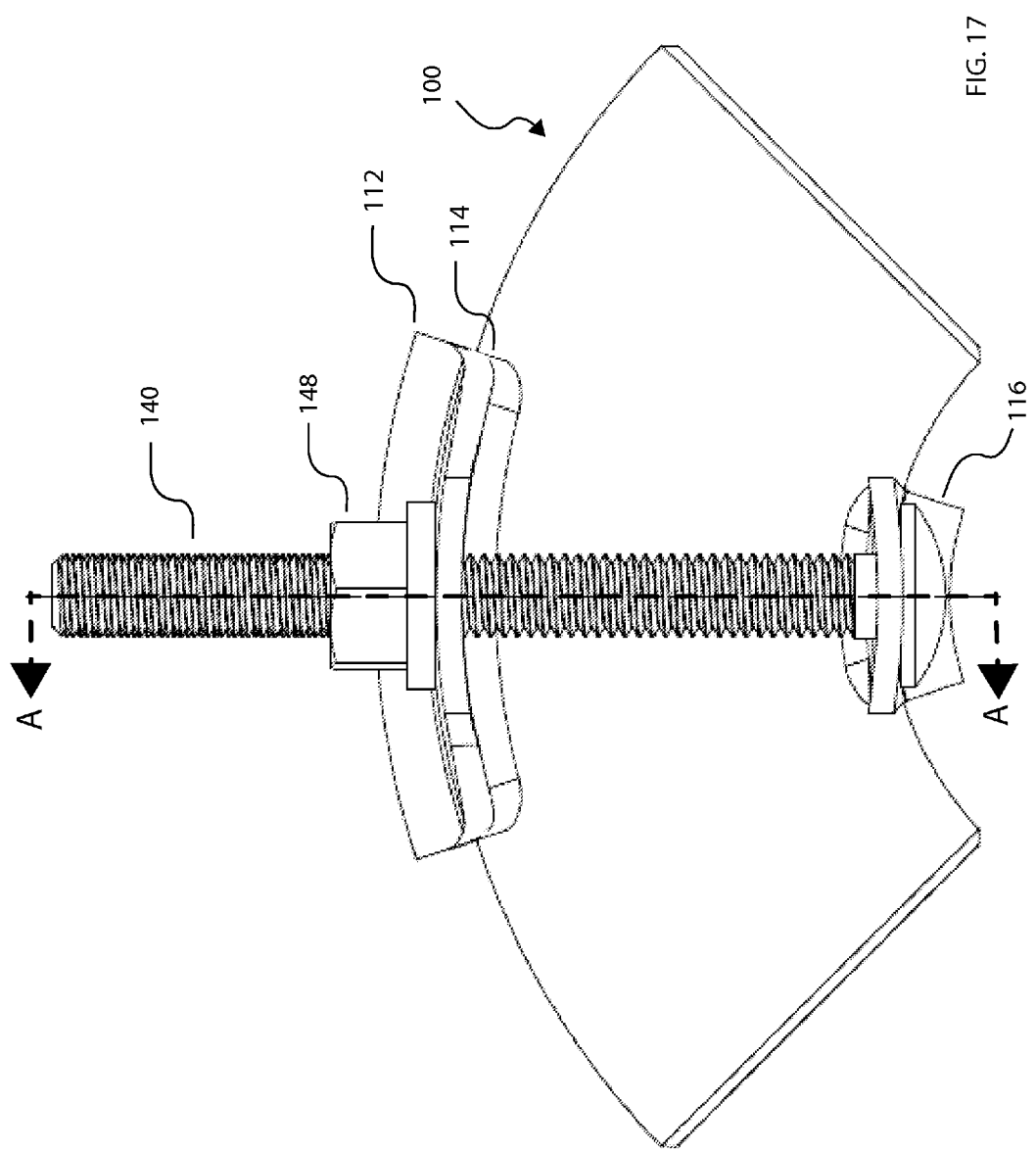

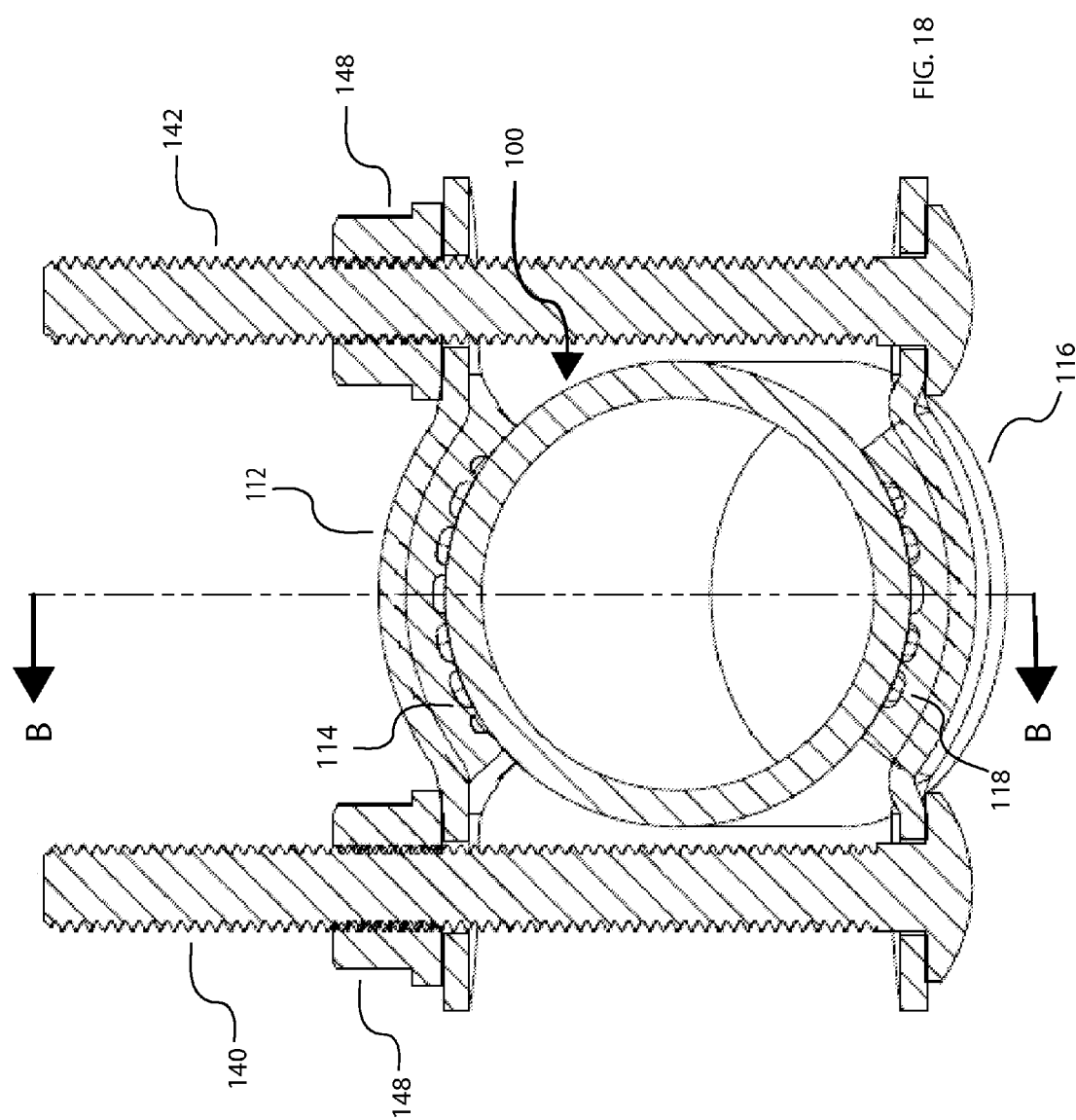

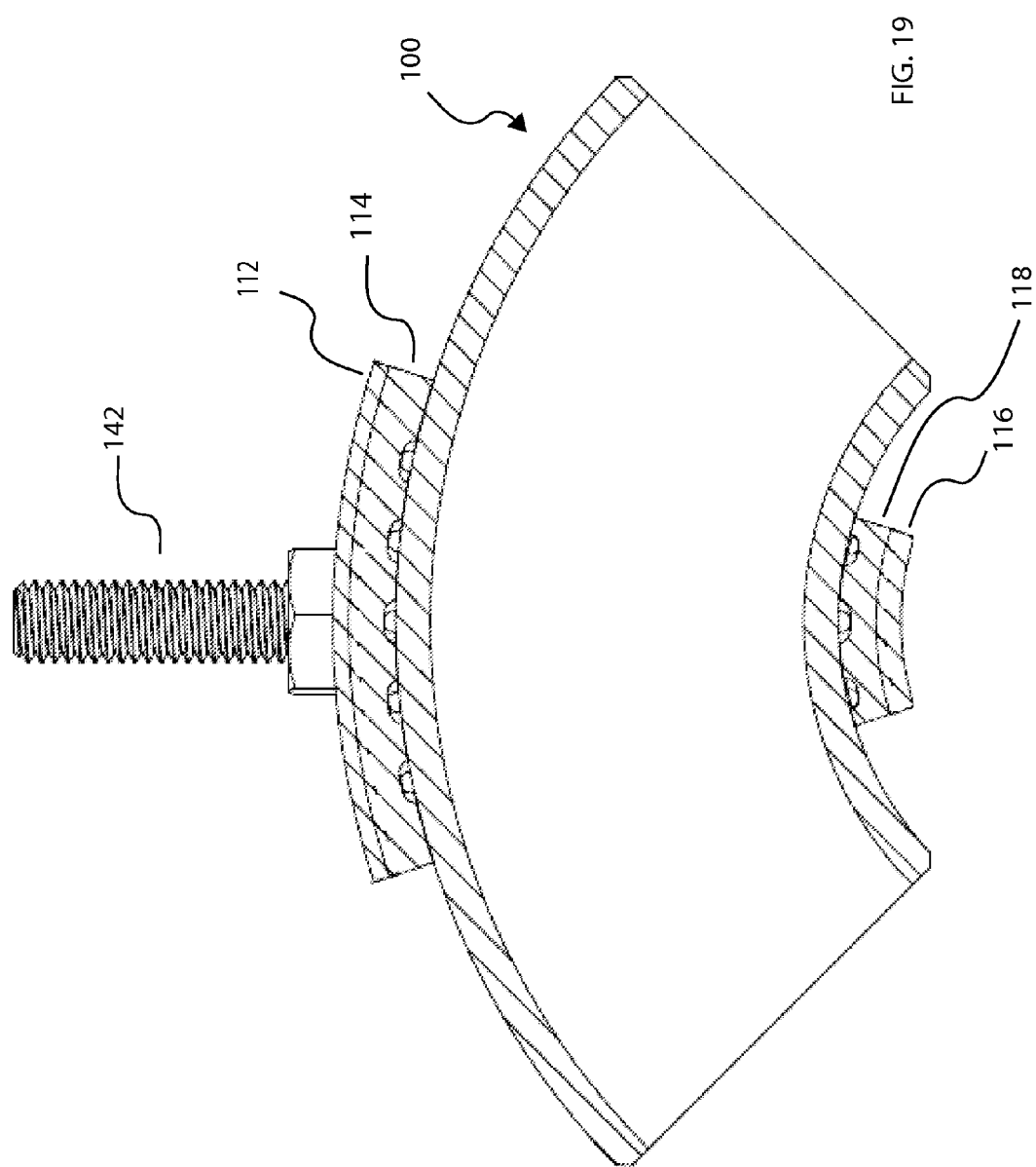

APPARATUS FOR PATCHING NON-LINEAR PIPE SECTIONS AND METHOD OF UTILIZING THE SAME

BACKGROUND OF THE INVENTION

The disclosed device relates generally to piping systems and making repairs to the same when the piping system requires either patching of a leak or reinforcement of a leaking section. There are tens of thousands of miles of pipelines utilized by a variety of industries for transporting fluids. Because of age and service which may involve transport of abrasive and/or fluids, the inner walls of these pipelines are subject to continual wear. When these lines fail, there is a loss of product, potential environmental damage, and potentially property damage and/or personal injury.

In cases where it is either impractical, inconvenient, or uneconomic to replace the entire pipeline, or the failed section, the leak may be repaired with a pipe patch, which is typically a metal jacket with a rubber gasket which is wrapped around a straight section of pipe and compressed until it stops the product leak until a more permanent solution can be performed such as replacing the leaking section of pipe. However, this type of device is generally only available for relatively straight sections of pipe. There are no comparable devices, which are relatively easy to install and relatively inexpensive, which may be rapidly installed to stop leaks in angled pipe sections, such as pipe 45 and 90 degree elbows (also referred to herein as "ell fittings" or "ells"). That is unfortunate because these types of fittings often experience greater internal wear than straight sections of pipe, particularly on the outward side of the elbow (i.e., on the convex side) where erosional damage and turbulence may be at a maximum because this surface undergoes the greatest of the change in flow direction of the fluid flowing in the line. Once the wear is significant enough, liquid will begin to leak through the pipe wall from the inside to the outside beginning with a dripping pinhole, then escalating to a larger hole leaking the fluids transported within the pipeline into the environment. The release of the material itself may be problematic. For example, if the material is oil, the release can be harmful to the environment and/or to personnel. Some fluids may be hot or toxic, and it almost always desirable to contain the leak as quickly as possible.

Given the nature of the fluid and the services, a pipeline leak can have severe consequences. When these leaks occur within elbows, under the known procedures, it is usually necessary to shut the pipeline down, which can result in plant shutdowns, lost product, delayed deliveries and expensive repairs. For example, various hot-tapping procedures require isolating the leaking pipe segment, thus requiring a system shut-down.

It should be further noted that failures on the inside bend of ell fittings is not uncommon, comprising 5 to 10 percent of ell failures. The availability of effective, fast, and easily installed repair solutions to failures of the inside bend is desirable. It would be desirable to have a fast and relatively inexpensive means of repairing leaks in elbows, where the repair apparatus is reliable and capable of providing service for a relatively extended period of time if necessary. It would also be desirable to have a repair apparatus which can be installed by a single individual without the need for welding apparatus or other specialized equipment.

SUMMARY OF THE INVENTION

Embodiments of the presently disclosed apparatus and method answers the need identified above. The present invention allows for a single person to almost immediately stop the leaking of product from a worn angle pipe by compressing a seal gasket and an arcuate reinforcement member against the wall of the leaking pipe fixture. Embodiments of the apparatus and method may be utilized on virtually all commonly used pipe sizes, ranging from 1 inch pipe to the largest possible pipe such as 60 inches in diameter.

An embodiment of the apparatus comprises an arcuate reinforcement member having a curvature which corresponds to the curvature of the elbow, which may range from 22.5 degrees to 90 degrees, and in some applications (i.e., "U" fittings), up to 180 degrees. The arcuate reinforcement member is urged against the exterior surface of the elbow, compressing a sealing member against the elbow surface, where the sealing member generally has a shape corresponding to the shape of the arcuate reinforcement member. The sealing member may be fabricated from materials which are resistant to breakdown by oil, condensate, or other fluids flowing through the piping system.

An embodiment of the apparatus may further comprise an opposite facing arcuate reinforcement member which will generally be urged against the inside radius of the fitting (i.e., the concave side), where the opposite facing arcuate reinforcement member also urges a sealing member against the exterior surface of the inside radius of the fitting, where the sealing member has a shape generally corresponding to the shape of the arcuate reinforcement member. The reinforcement members are hereinafter referred to as the outside reinforcement member, referring to a reinforcement member which is urged against the outside radius of the fitting, and the inside reinforcement member, corresponding to a reinforcement member which is urged against the inside radius of the fitting. When utilized together, the outside reinforcement member and the inside reinforcement member encircle the girth of the fitting to be repaired each urging its respective sealing member against the exterior surface of the fitting, the reinforcement members each reinforcing one another, and further supporting the fitting.

In one embodiment of the apparatus, the outside reinforcement member and the inside reinforcement members are each integral to a band, wherein the bands may be connected together to encircle the fitting. Each band may comprise a fastener retaining structure (referred to herein as a "fastener retaining block") on each side of the arcuate reinforcement member, each fastener retaining block comprising an aperture for receiving a fastener. When installed on a fitting, a fastener retaining block of one band is in facing relation with a corresponding fastener retaining block of the other band, with the apertures of each fastener retaining block in general alignment, allowing the outside reinforcement member and the inside reinforcement member to be attached to the fitting by the insertion of fasteners within the apertures of the fastener retaining blocks.

When the reinforcement members are thus attached together, an enclosing structure is defined which fits around the pipe fitting. An aperture of at least one of the fastener retainer blocks may comprise a slot which extends through the side of the retainer block, thus allowing a fastener to be located within the aperture by pivoting of the fastener through the slot into the aperture. This feature allows the opposing reinforcement members, held together by a single fastener on one side, to be installed on a fitting as a single unit, and then secured by pivoting the second fastener through the slot. This feature allows the apparatus to be quickly installed by a single person, and allows the apparatus to be installed without removing nuts from either fastener.

Alternatively, the apparatus may comprise a hinge on one side which attaches the outside reinforcement member and the inside reinforcement members, while the opposite side comprises a latch mechanism which may comprise a hook member which is pivotally attached to an end of a reinforcement member while the opposite facing reinforcement member comprises a keeper, which catches a portion of the hook member. Thus, when the hook member engages the keeper, the outer reinforcement member and the inside reinforcement members enclose the fitting, each reinforcement member urging its integral sealing member against the exterior surface of the fitting. The operative length of the hook member may be adjustable such that the tension placed on the reinforcement members can be adjusted as desired, to provide a tighter seal, or to make the latch mechanism easier to close. For example, the hook member may comprise a bolt having a head which engages the keeper. The opposite end of the bolt may be retained by a pivot member attached to the fastener retainer block of the opposite reinforcement member, where the bolt may be either screwed into the fastener retainer block to shorten the length of the hook member, or the bolt may be backed out of the fastener retainer block to increase its length. Alternatively, the latch mechanism may employ an over-center action to apply sufficient closing force to the reinforcement members.

The inside reinforcement member provides for substantial reinforcement of the outside reinforcement member, and allow the urging of the respective sealing members against the exterior surface of the fitting without the reinforcement members actually making contact with the fitting. One benefit of this configuration is that if the reinforcement members are metallic, corrosion problems which might arise from dissimilar metals between the reinforcement members and the fitting will be limited by the absence of surface contact between the fitting and the reinforcement members. The sealing members which may be utilized with embodiments of the invention not only facilitate obtaining a leak-tight seal, but also provide insulation between the material of the reinforcement members and the pipe fitting, thus again avoiding a corrosion cell generated by the use of dissimilar metals. Of course, depending upon the application, the reinforcement members may be manufactured from non-metallic materials, such as carbon fiber composites, fiber glass or other materials appropriate for the application.

It should be noted that actual fitting sizes may vary within a nominal size due to differences in production techniques utilized at different manufacturing facilities. However, because embodiments of the present device utilize reinforcement members having a shape which does not individually enclose the entire girth of the fitting, the present apparatus may be utilized for fittings which are not precisely the same size. This adaptability is further enhanced by the utilization of the sealing member and the positive closing force applied by the fasteners on each side of the apparatus or latch mechanism, such that a precise fit is not required to obtain a repair of the pipe fitting.

BRIEF DESCRIPTION OF THE DRAWINGS

FIG. 17 shows a side view of the embodiment of FIG. 12 attached to a pipe fitting.

FIG. 18 shows a sectioned view along line A-A from FIG. 17.

FIG. 19 shows a sectioned view along line B-B from FIG. 18.

DETAILED DESCRIPTION OF THE EMBODIMENTS

Referring now to the figures, FIGS. 1 through 4 show an embodiment of the apparatus 10 in a closed position without being installed on an elbow fitting 100. This embodiment of the apparatus comprises an arcuate outside reinforcement member 12 having a radius $R_1$ which is based upon the pipe's diameter. The arcuate reinforcement member also has a radius $R_2$ which is defined by the curvature or amount of bend in the fitting as it changes direction. Standard pipe elbows are available as 90 degrees and 45 degrees, with available ranges of 22.5 degrees to 90 degrees. For a long radius elbow, radius $R_2$ will typically be 1.5× diameter centerline radius.

Figure 10:
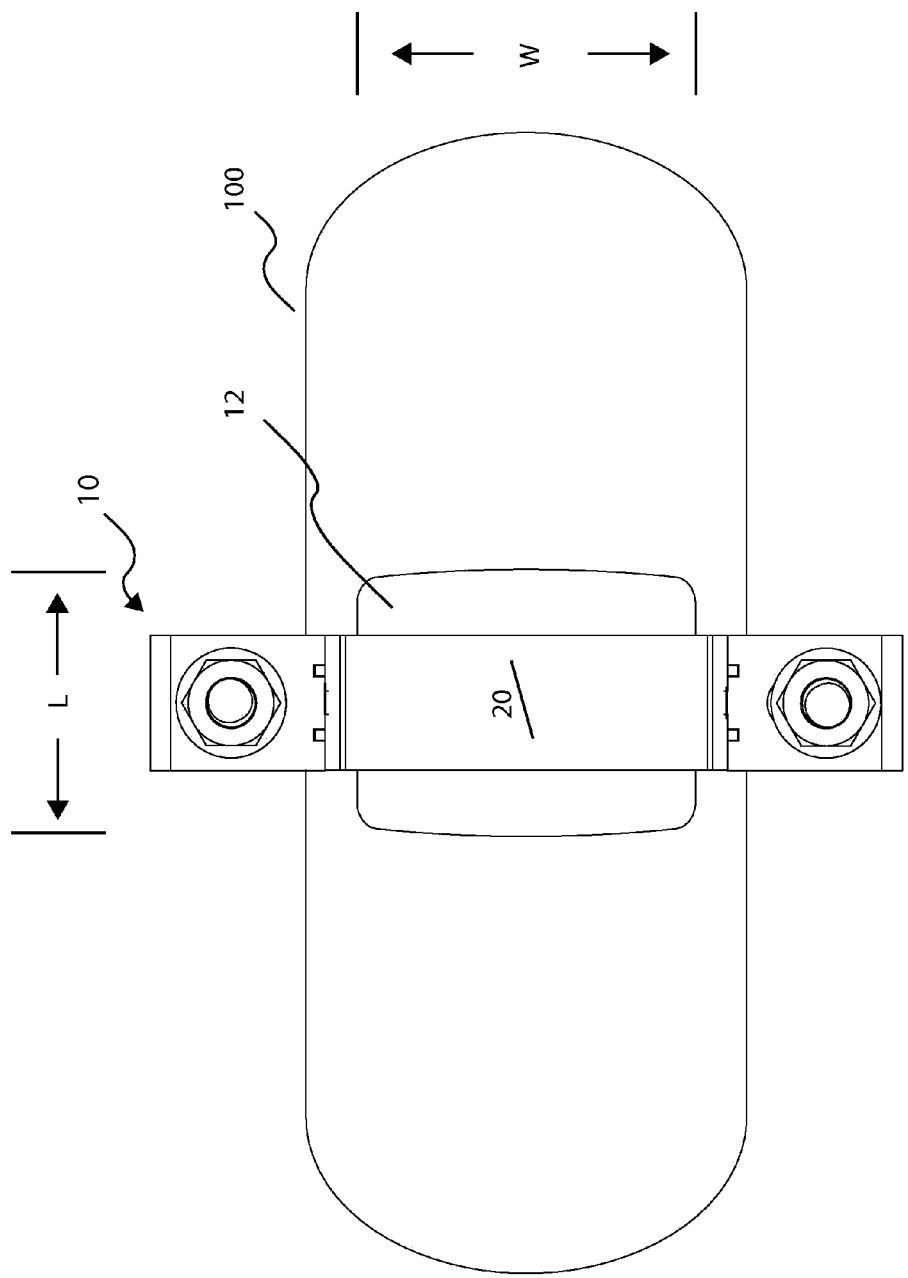
FIG. 10 shows a top/bottom view of an embodiment of the disclosed device attached to a pipe fitting.
Figure 11:
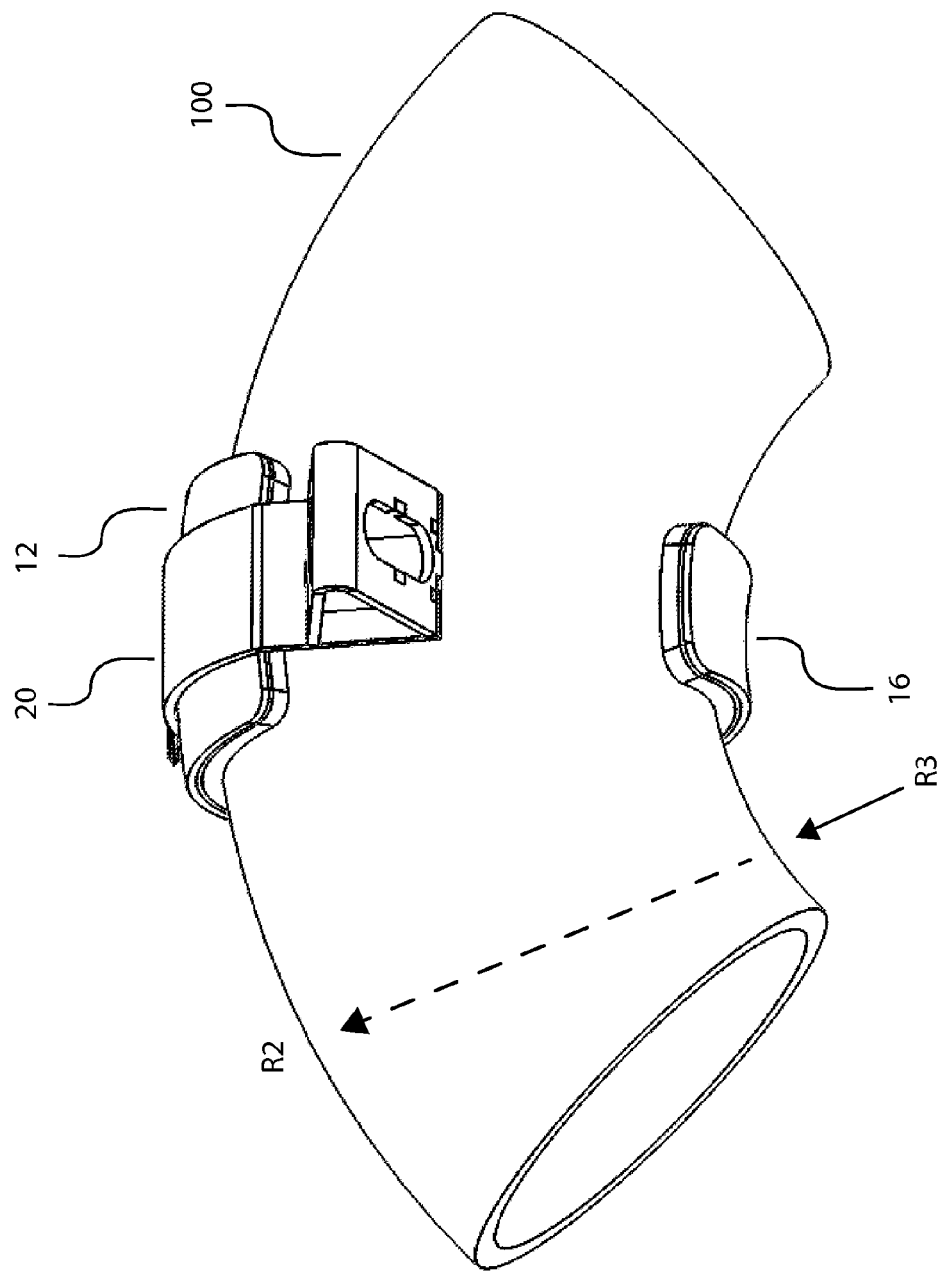
FIG. 11 is a close up view of the inside reinforcement member attached to a pipe fitting.
Figure 12:
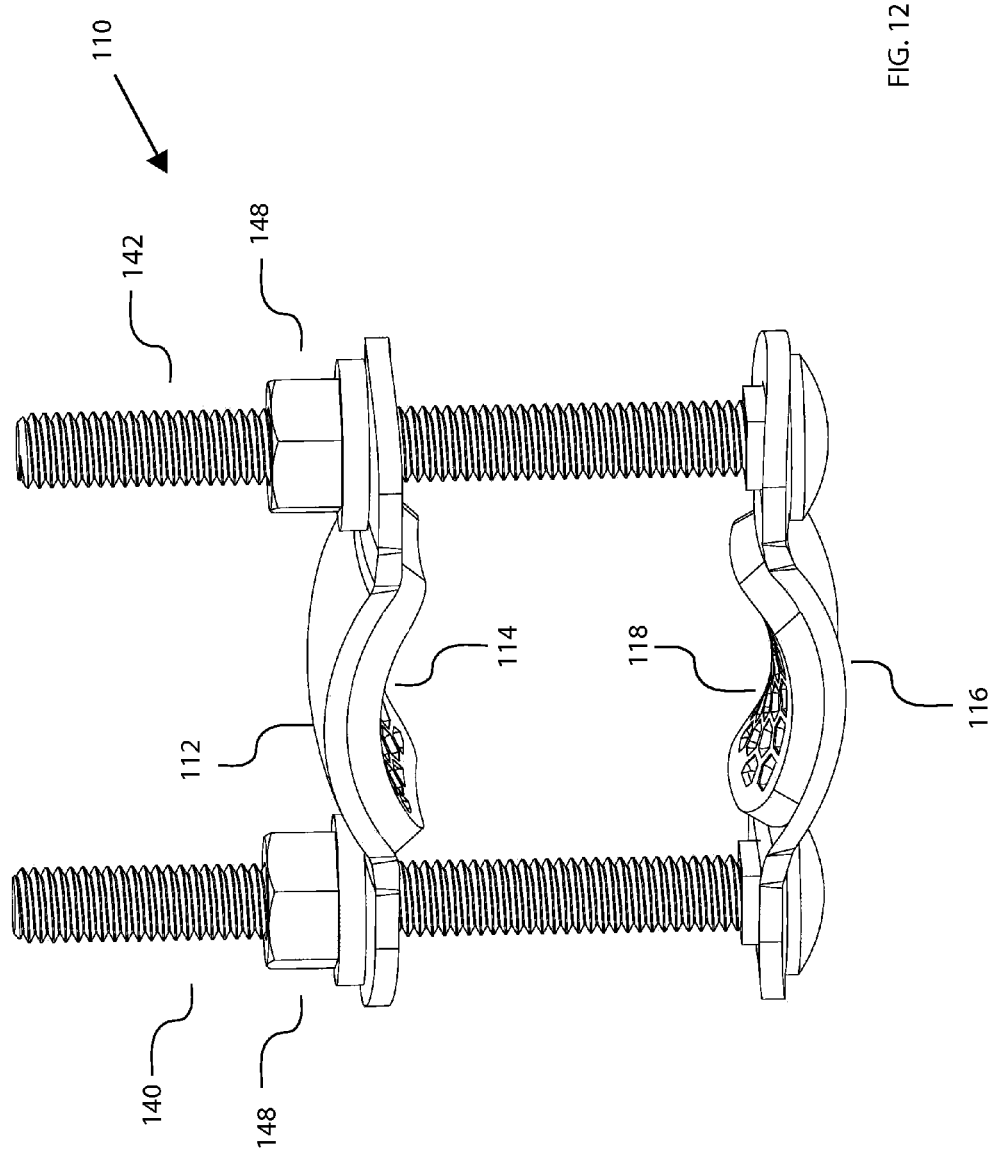
FIG. 12 shows a perspective view of another embodiment of the disclosed device.
Figure 13:
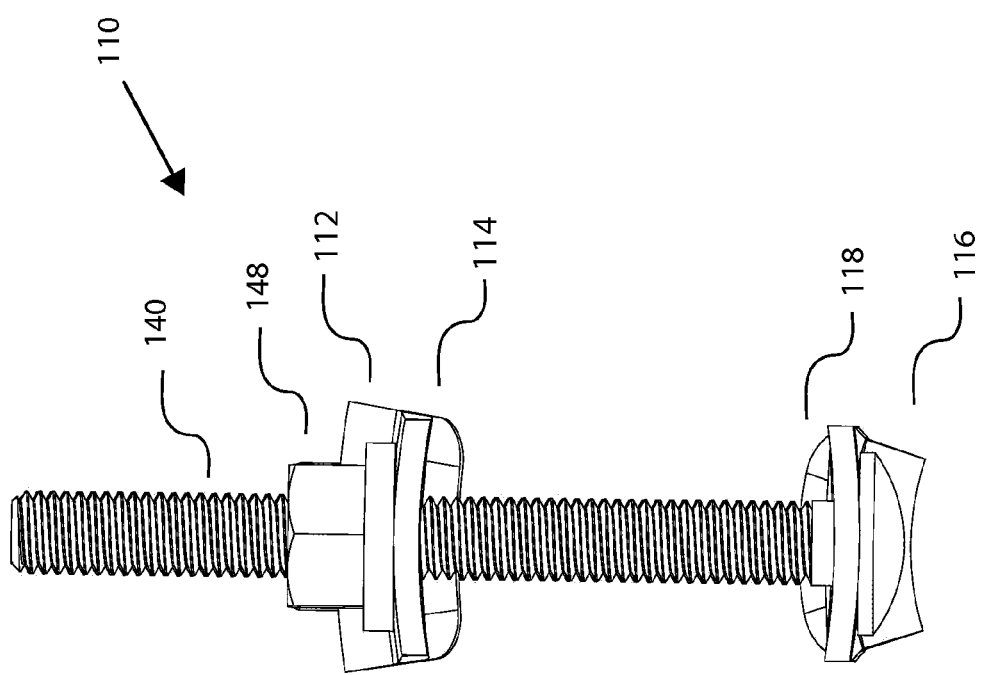
FIG. 13 shows a side view of the embodiment shown in FIG. 12.
Figure 14:
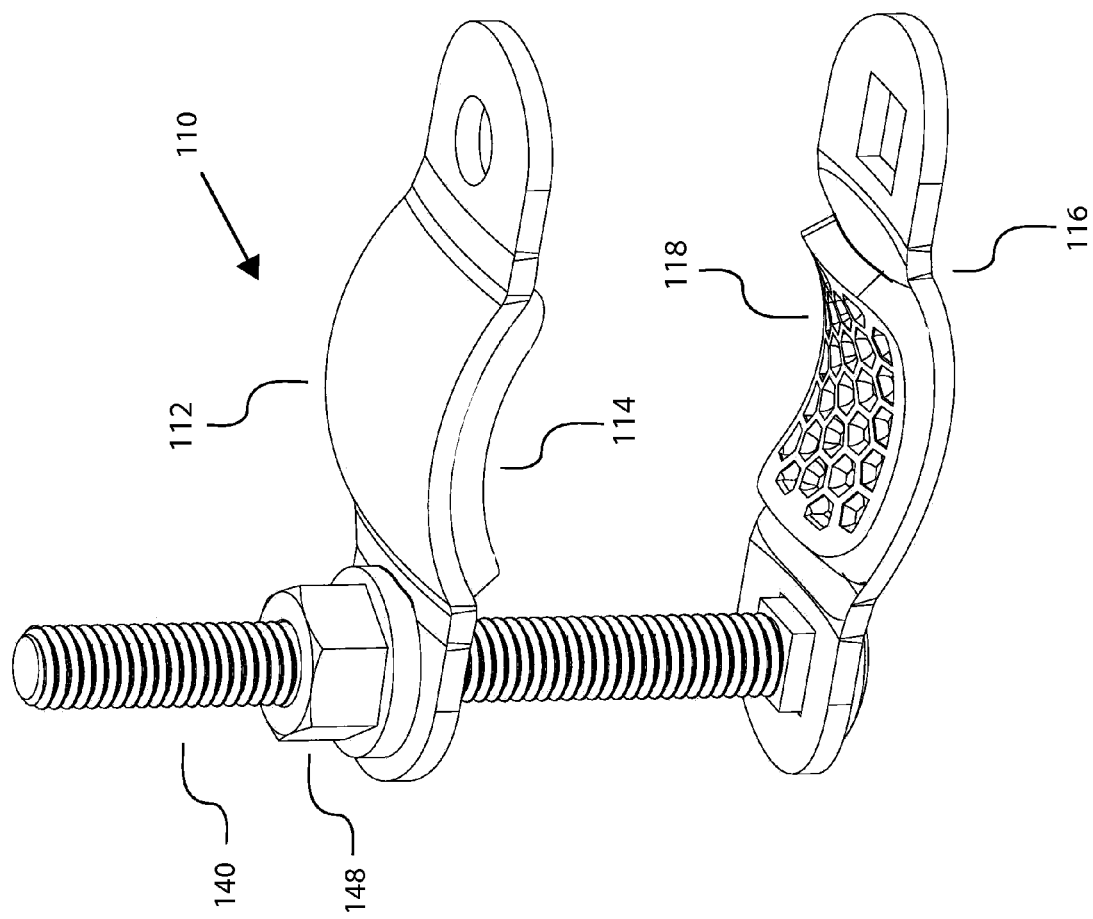
FIG. 14 shows a perspective view of the embodiment shown in FIG. 12 with one fastener removed to facilitate installation of the device on a pipe fitting.
Figure 15:
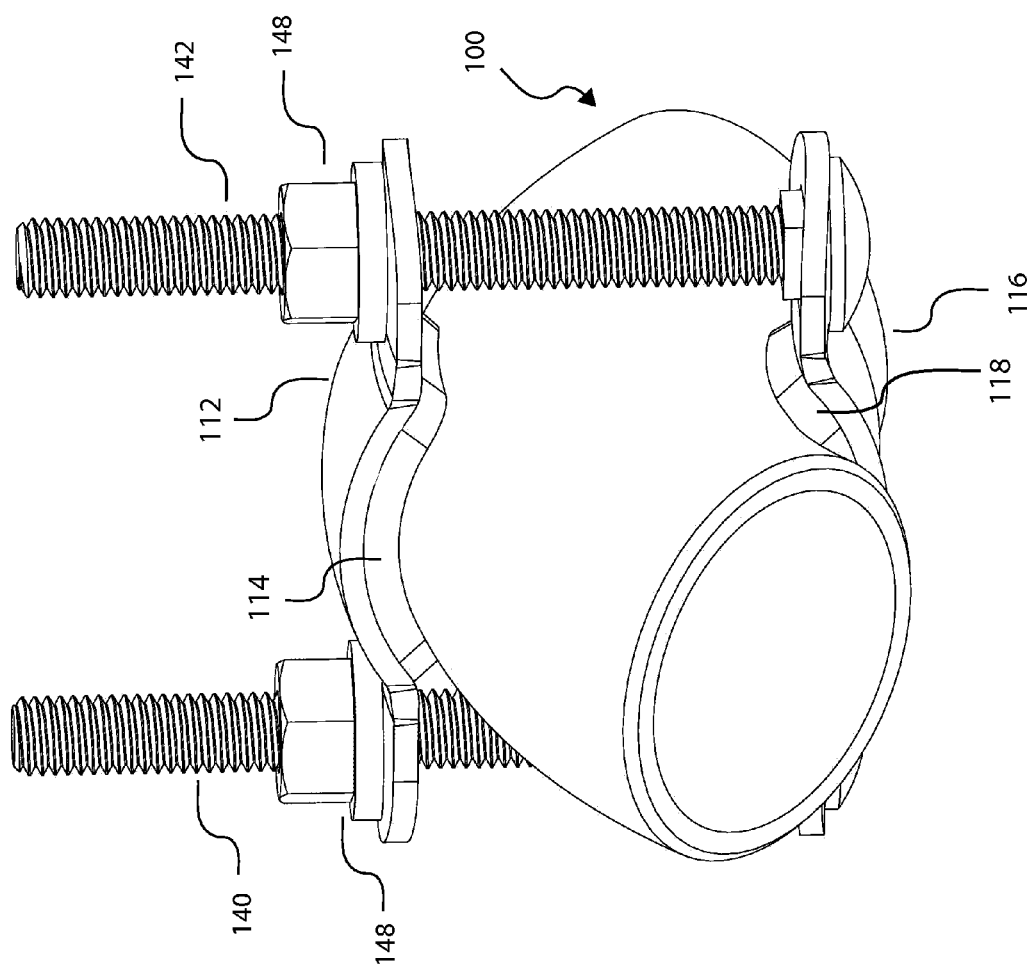
FIG. 15 shows a perspective view of the embodiment of FIG. 12 attached to a pipe fitting.
Figure 16:
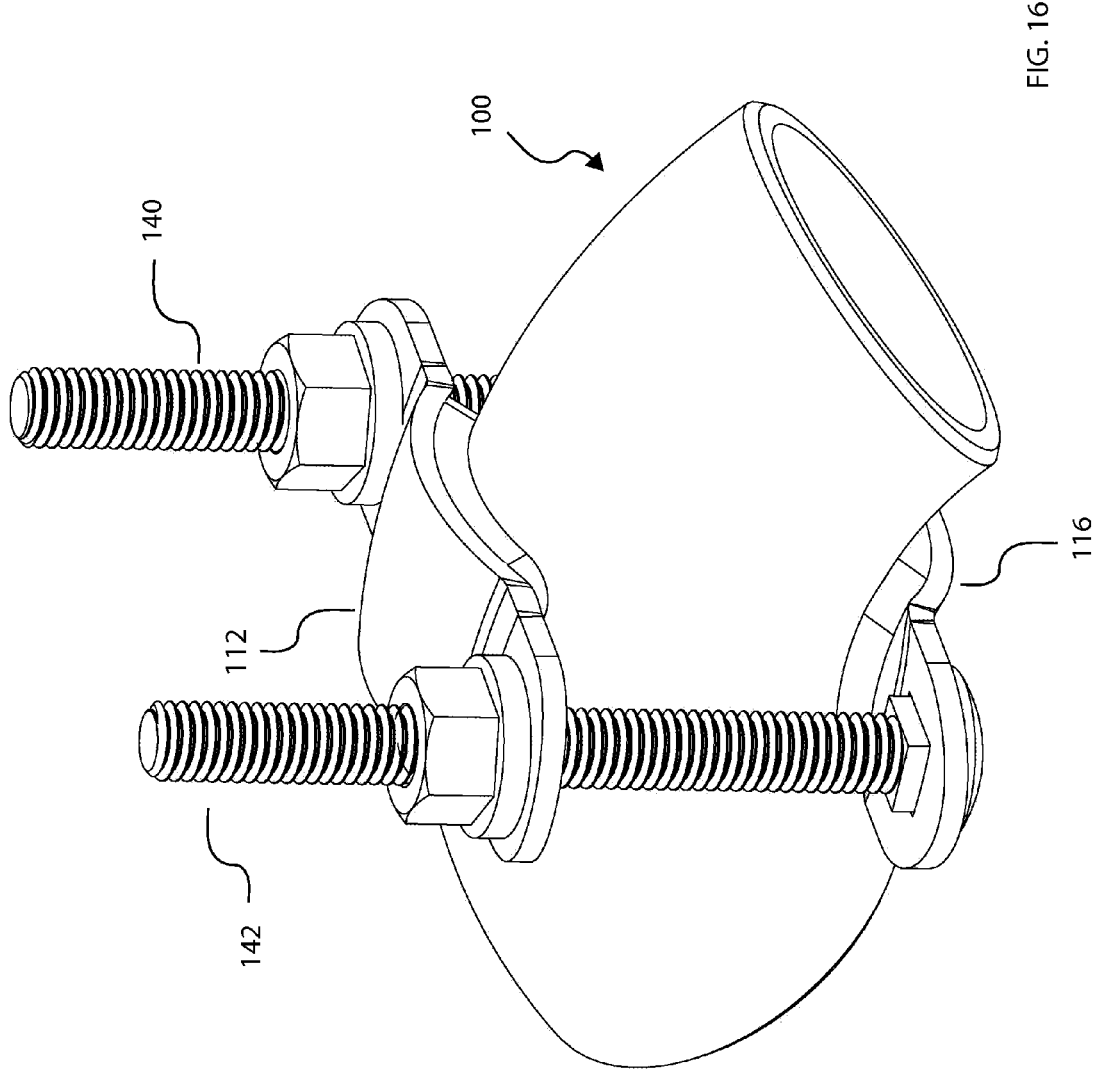
FIG. 16 shows a second perspective view of the embodiment of FIG. 12 attached to a pipe fitting.

The outside reinforcement member 12 is urged against the exterior surface of the elbow 100, compressing a sealing member 14 against the outside convex surface of the elbow 100, where the outside reinforcement member 12 and sealing member 14 generally have a shape corresponding to the shape of the outside surface of the fitting 100. In other words, as illustrated in FIG. 10, the reinforcement member has a width W which fits circumferentially about the fitting, and a length L which fits along a portion of the length of the fitting. A short radius $R_1$ is defined along the first width corresponding to the radius of curvature of fitting circumference. A long radius $R_2$ is defined along the first length of the outside reinforcement member 12 corresponding to the radius of curvature along the length of the ell fitting. FIG. 18, while showing a different embodiment 110' of the invention, best shows the relationship of the radius of the reinforcement members 112, 116 and the corresponding sealing members 114, 118 with the radius of the pipe diameter. FIG. 19, also showing embodiment 110', best shows the relationship of the sealing members 114, 118 with the radius defined along the longitudinal axis of the fitting 100'. The reinforcement members 12, 16 and sealing members 14, 18 of embodiment 10 have a similar relationship with fitting 100.

An embodiment of the apparatus 10 may further comprise an opposite facing arcuate inside reinforcement member 16 which will generally be urged against the inside concave side 102 of the fitting, where the concave side is defined by a radius $R_3$ The inside reinforcement member 16 urges a sealing member 18 against the exterior surface of the inside radius of the fitting, where the sealing member has radii of curvature $R_1$ and $R_3$ and a shape generally corresponding to the shape of the arcuate reinforcement member 16. Each of the sealing members 14, 18 may have a textured or gridded surface to provide for enhanced sealing effectiveness.

Figure 7:
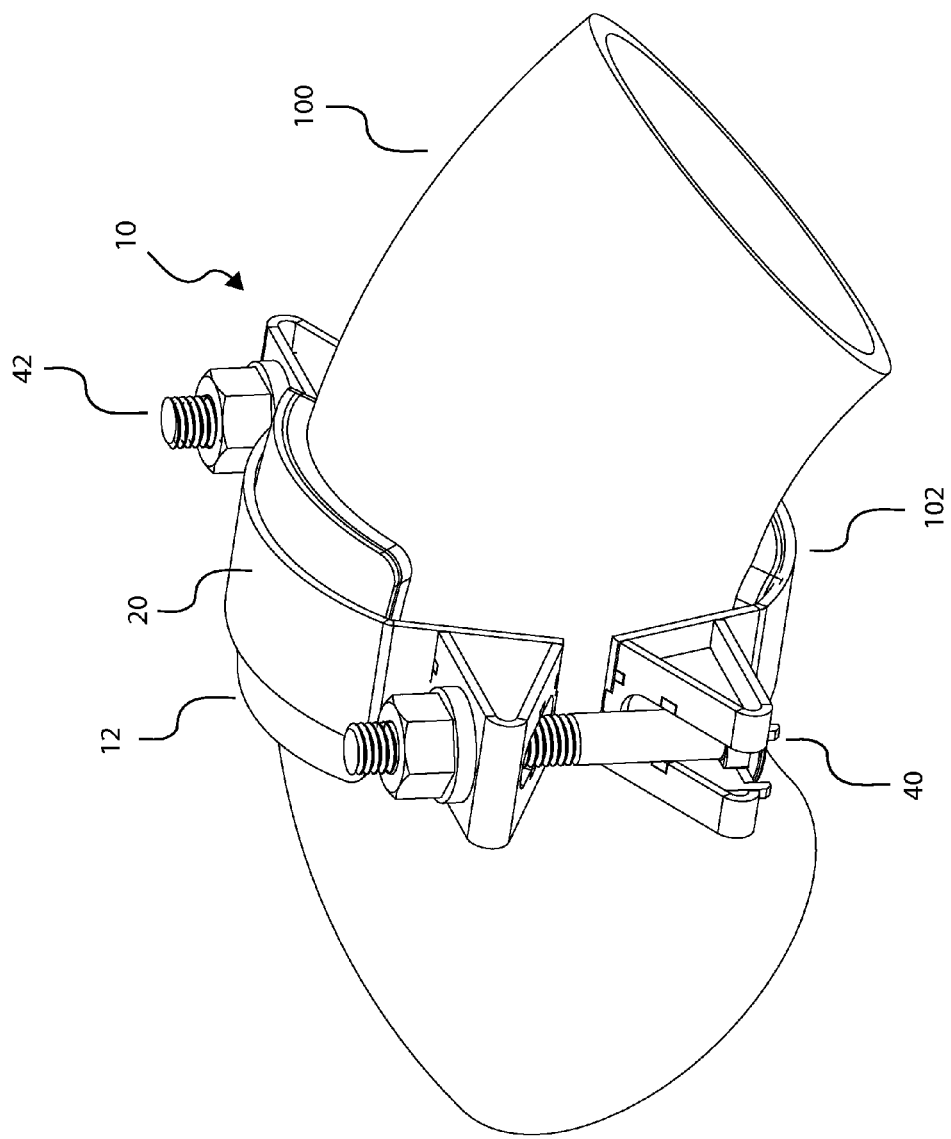
FIG. 7 shows a perspective view of an embodiment of the disclosed device attached to a pipe fitting.
Figure 8:
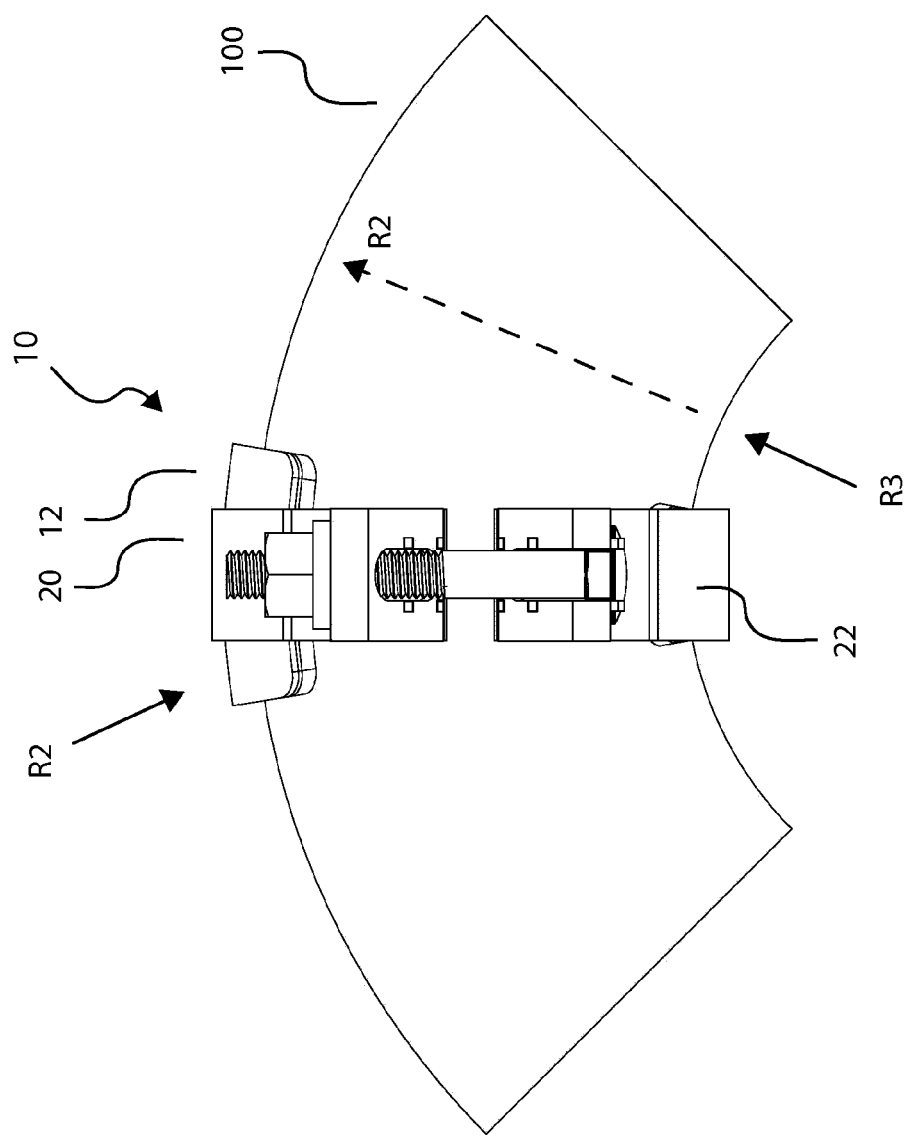
FIG. 8 shows a side view of an embodiment of the disclosed device attached to a pipe fitting.
Figure 9:
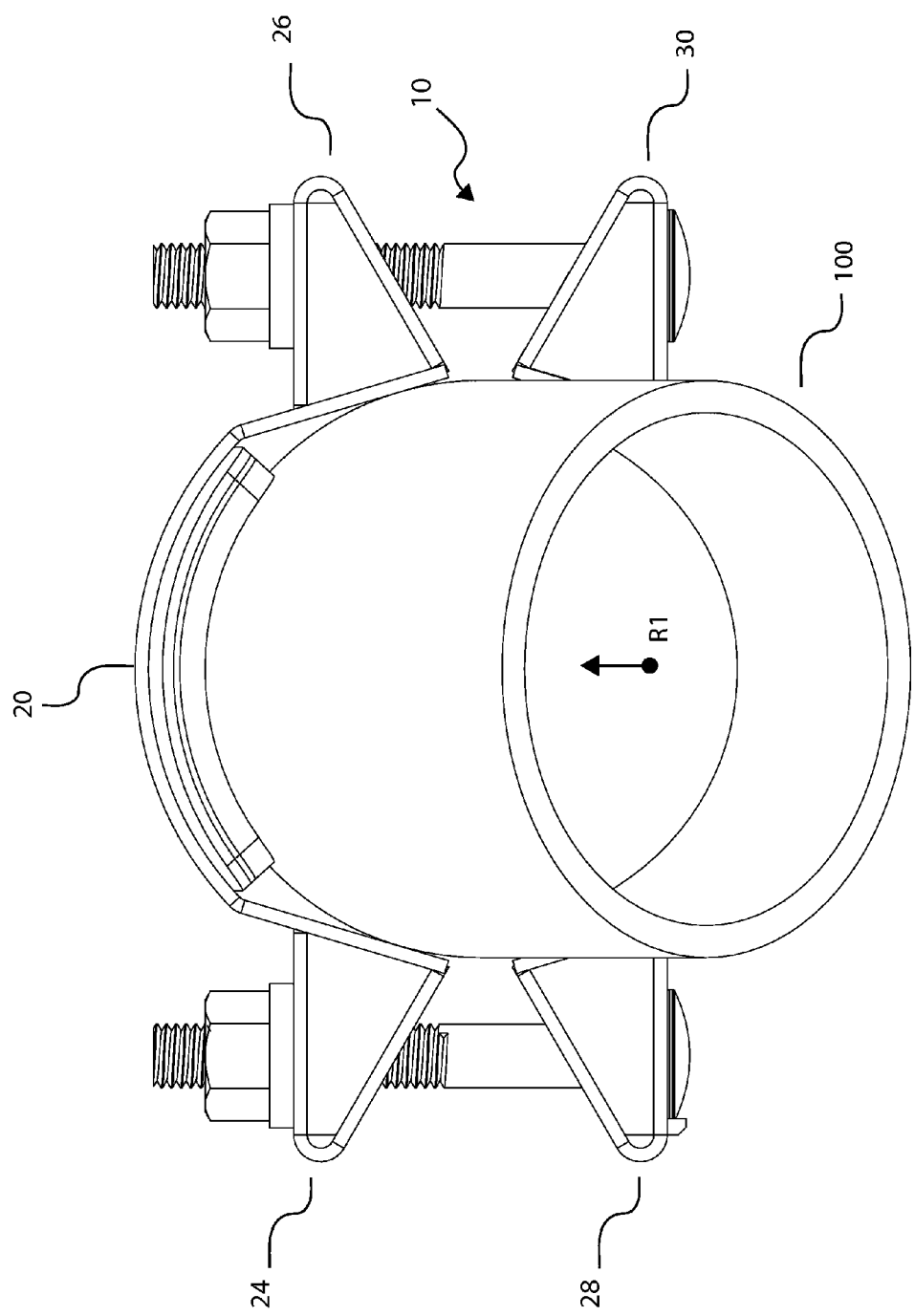
FIG. 9 shows a front/back view of an embodiment of the disclosed device attached to a pipe fitting.

As suggested by the figures, the inside reinforcement member 16 may be smaller in length than the outside reinforcement member 12, where the "length" L of each reinforcement member 12, 16 is considered to be parallel to the long axis of the fitting 100, as indicated in FIG. 10. The inside reinforcement member 16 may have a shorter length L than the outside reinforcement member 12 to allow for the placement of the inside reinforcement member 16 against the concave portion 102 of the fitting 100. The inside reinforcement member 16 have the same length L as band 22. As shown in FIGS. 7-9, when utilized together, the outside reinforcement member 12 and the inside reinforcement member 16 and the respect bands 20, 22 and bolts 40, 42 may encircle the girth of the fitting 100 to be repaired, with each reinforcement member 12, 16 urging its respective sealing member 14, 18 against the exterior surface of the fitting 100. In this configuration, the reinforcement members 12, 16 each reinforce one another, and further supporting the fitting 100.

In one embodiment of the apparatus 10, outside reinforcement member 12 is attached to band 20. Likewise, inside reinforcement member 16 is attached to band 22. The reinforcement members 12, 16 may be separately attached to the respective bands 20, 22 by welding, rivets, or other fastener types. Alternatively, the reinforcement members 12, 16 may be integral to the bands 20, 22. The apparatus 10 comprises closing means for closing the two bands 20, 22 to encircle the fitting 100. Such closing means may include the use of bolts 40, 42. Alternatively, the closing means may include the use of latches and corresponding keepers at the ends of bands 20, 22. Alternatively, the closing means may include a hinge connecting adjacent ends of bands 20, 22, while the opposite ends of the bands comprise a latch and keeper. The closing means may comprise other means which attach the bands 20, 22 to one another such that the associated reinforcement members 12, 16 are disposed about a portion of the girth of the fitting 100.

Band 20 may comprise one or more fastener retaining structures, i.e., fastener retaining blocks 24, 26 on each end of the band, such that the fastener retaining blocks are on either side of the outside reinforcement member 12. It is to be noted that the term "fastener retaining block," as used herein, refers to any attached or integral structure on the bands 20, 22 which may be utilized to attach a fastener which connects the two bands, and does not necessarily require a "block" structure.

Likewise, band 22 may comprise a fastener retaining block 28, 30 on each side of the band, such that the fastener retaining blocks are on either side of the inside reinforcement member 16. As shown in the figures, the fastener retaining blocks may each be a triangular shaped structure which is formed by the ends of the bands 24, 26.

The fastener retaining blocks 24, 26, 28, 30 may each comprise an aperture 32, 34, 36, 38 for receiving a fastener 40, 42, where the appertures 32, 34, 36, 38 extend through two of the legs of the triangular shaped structure of the fastener retaining blocks. At least one of the apertures 36 may comprise a slot 44 which extends through fastener retaining block 28, thereby allowing fastener 40 to be laterally pivoted into position. Apertures 32, 34, 36, 38 may be have an elliptical cross-section which allows for lateral movement of the fasteners 40, 42 within the apertures to facilitate installation of the apparatus 10. Fasteners 40, 42 are typically threaded and may be secured on one end with nuts 46 and may have a pan head 48, 50. These features allow opposing reinforcement member band combinations to be held together by a single fastener 42 on one side and installed on a fitting as a single unit as opposed to two separate pieces. The assembly may then be secured by pivoting the second fastener 40 through the slot 44. This feature allows the apparatus to be quickly installed by a single person, and allows the apparatus to be installed without removing nuts from either fastener.

Figure 1:
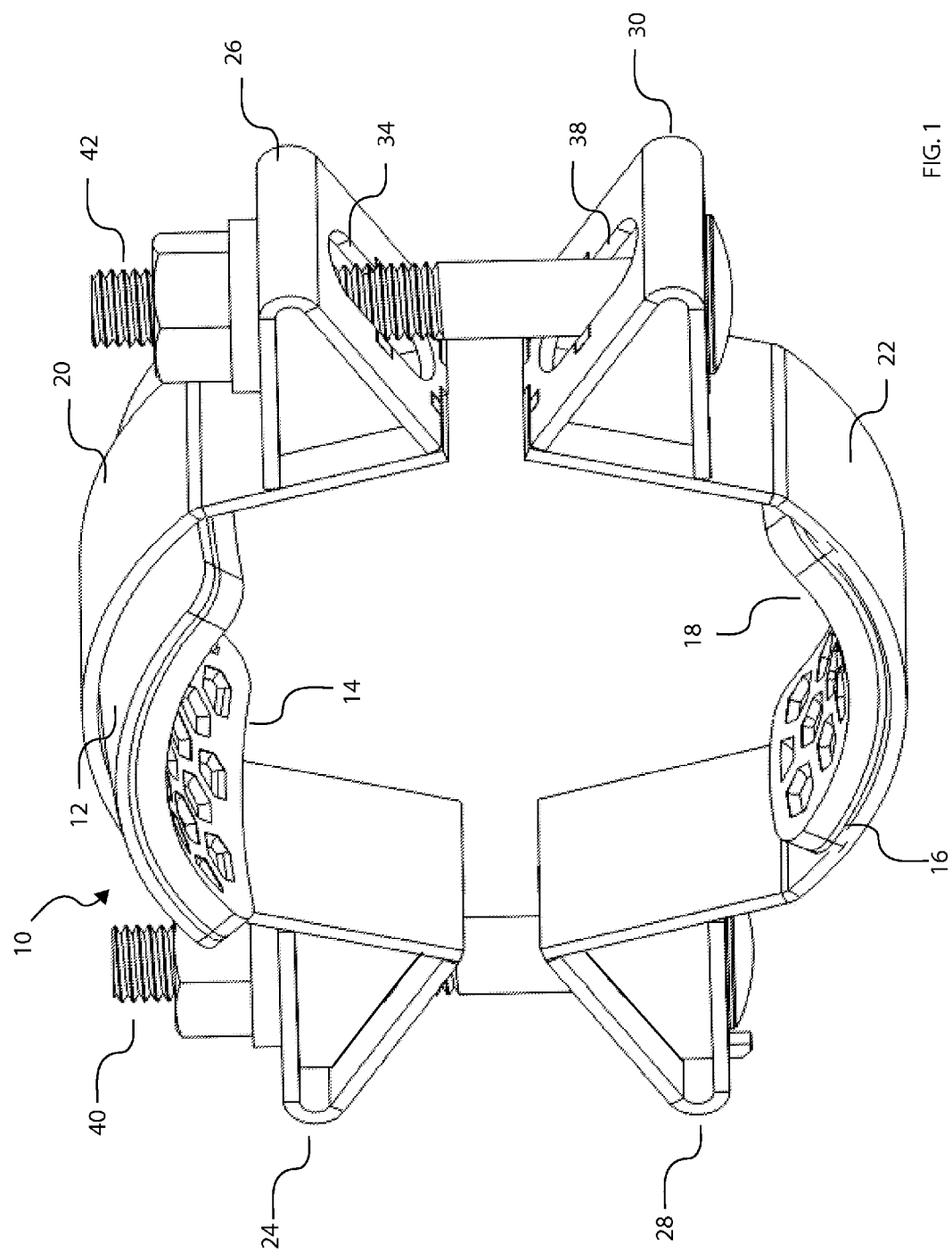
FIG. 1 shows a perspective view of an embodiment of the presently disclosing apparatus.
Figure 2:
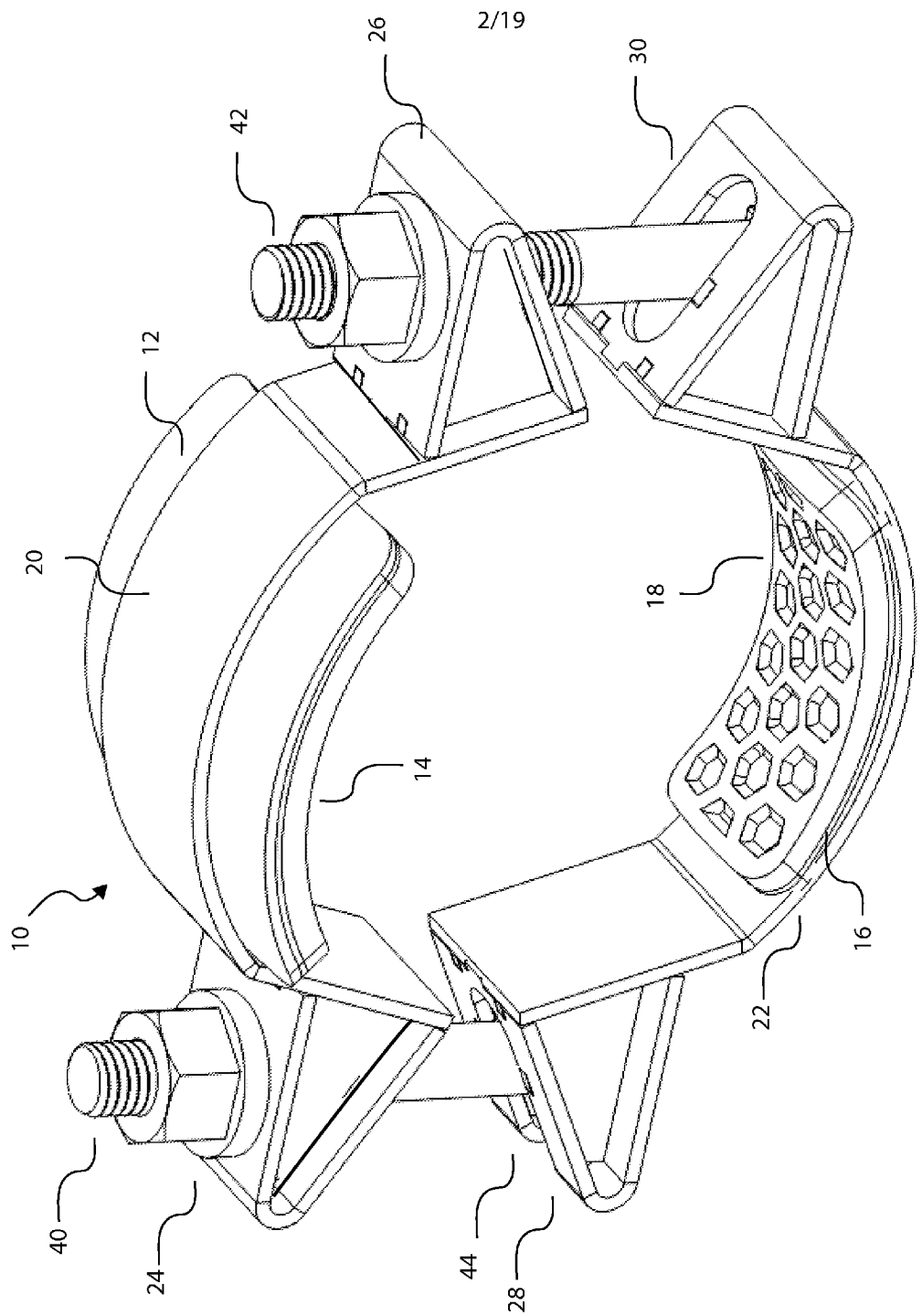
FIG. 2 shows a second perspective view of the embodiment shown in FIG. 1.
Figure 3:
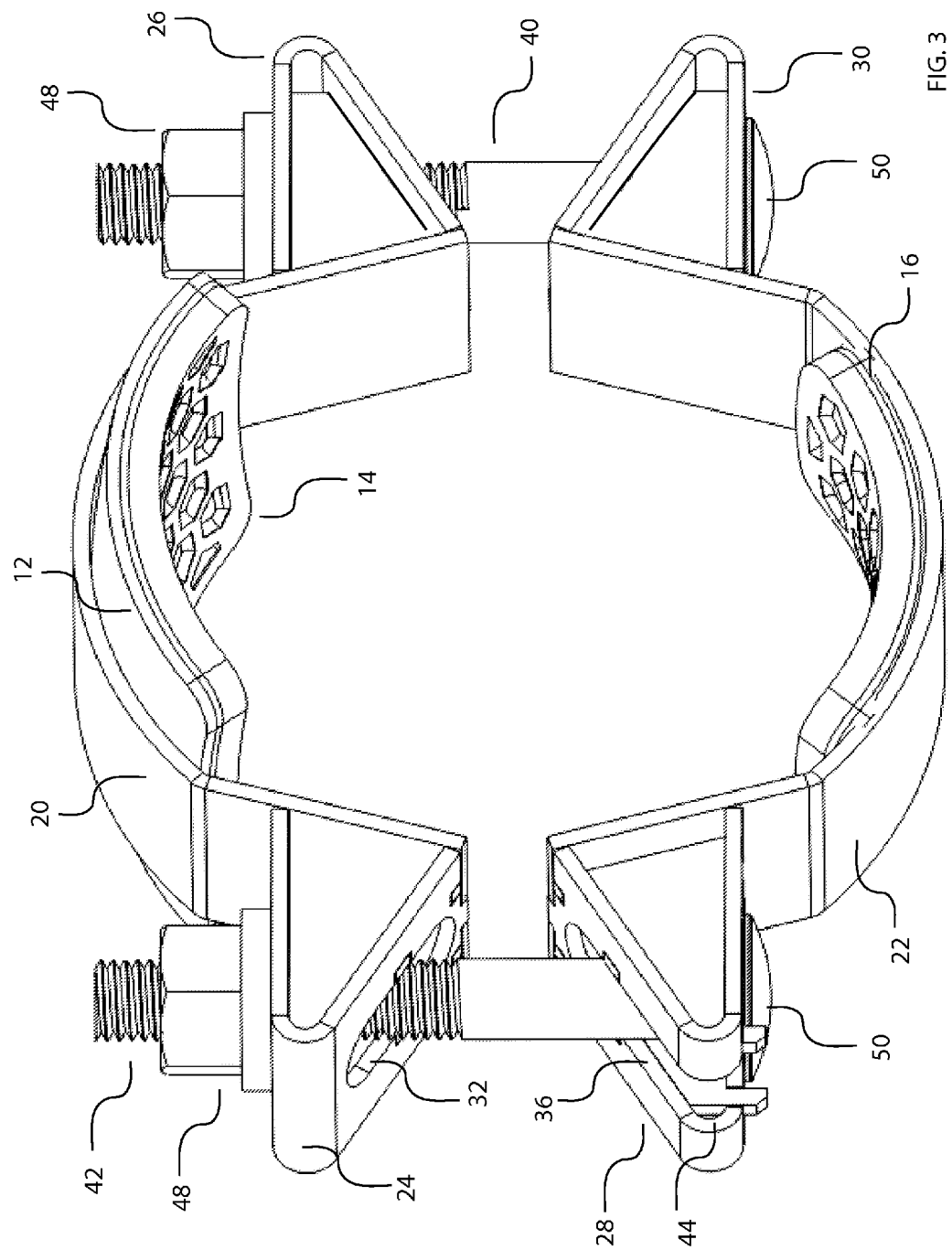
FIG. 3 shows another perspective view of the embodiment of the apparatus shown in FIG. 1.
Figure 4:
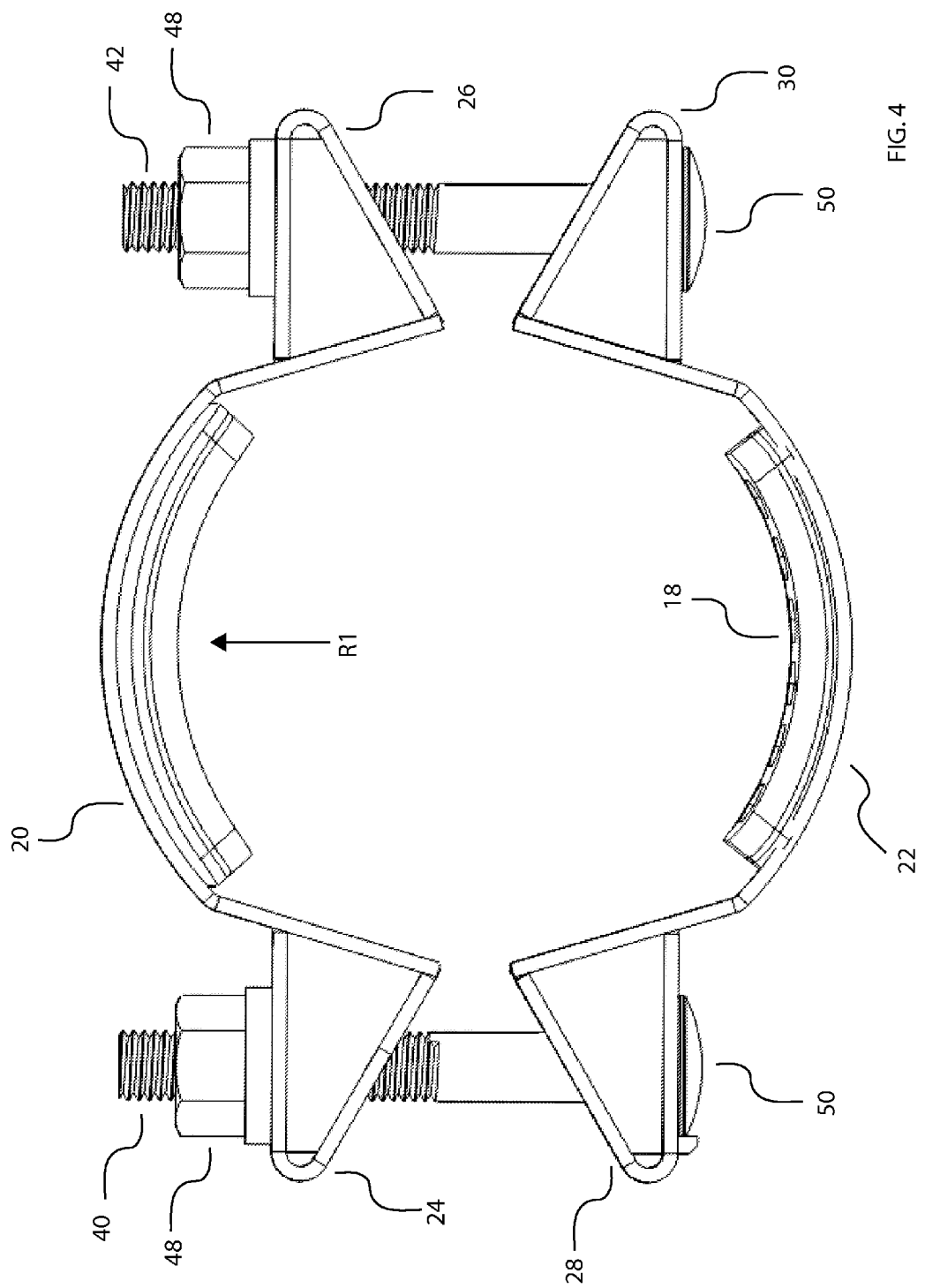
FIG. 4 shows a front/back view of an embodiment of the disclosed device.
Figure 5:
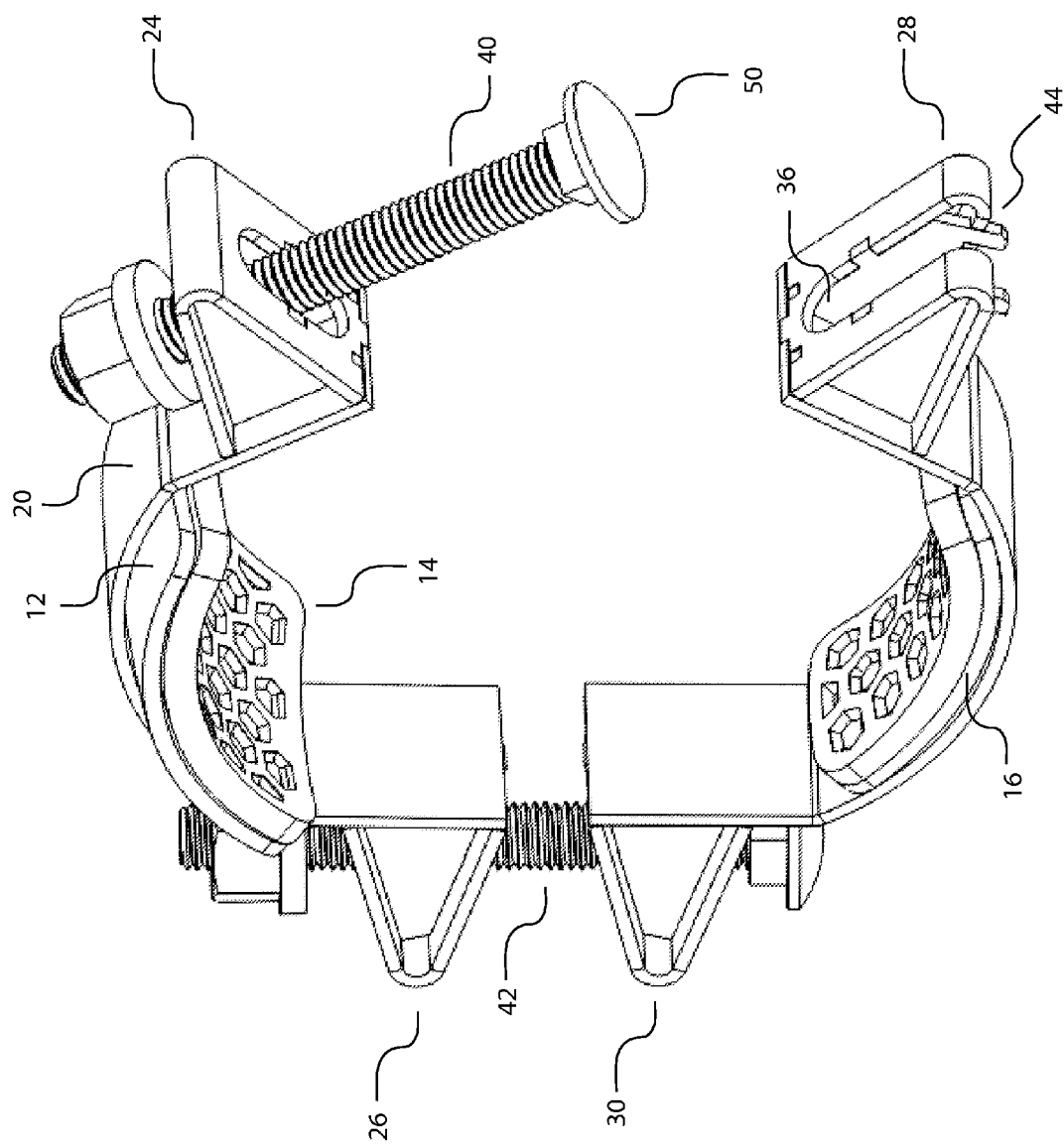
FIG. 5 shows a perspective view of an embodiment of the disclosed device in an "open" position, prior to installation on a pipe fitting.
Figure 6:
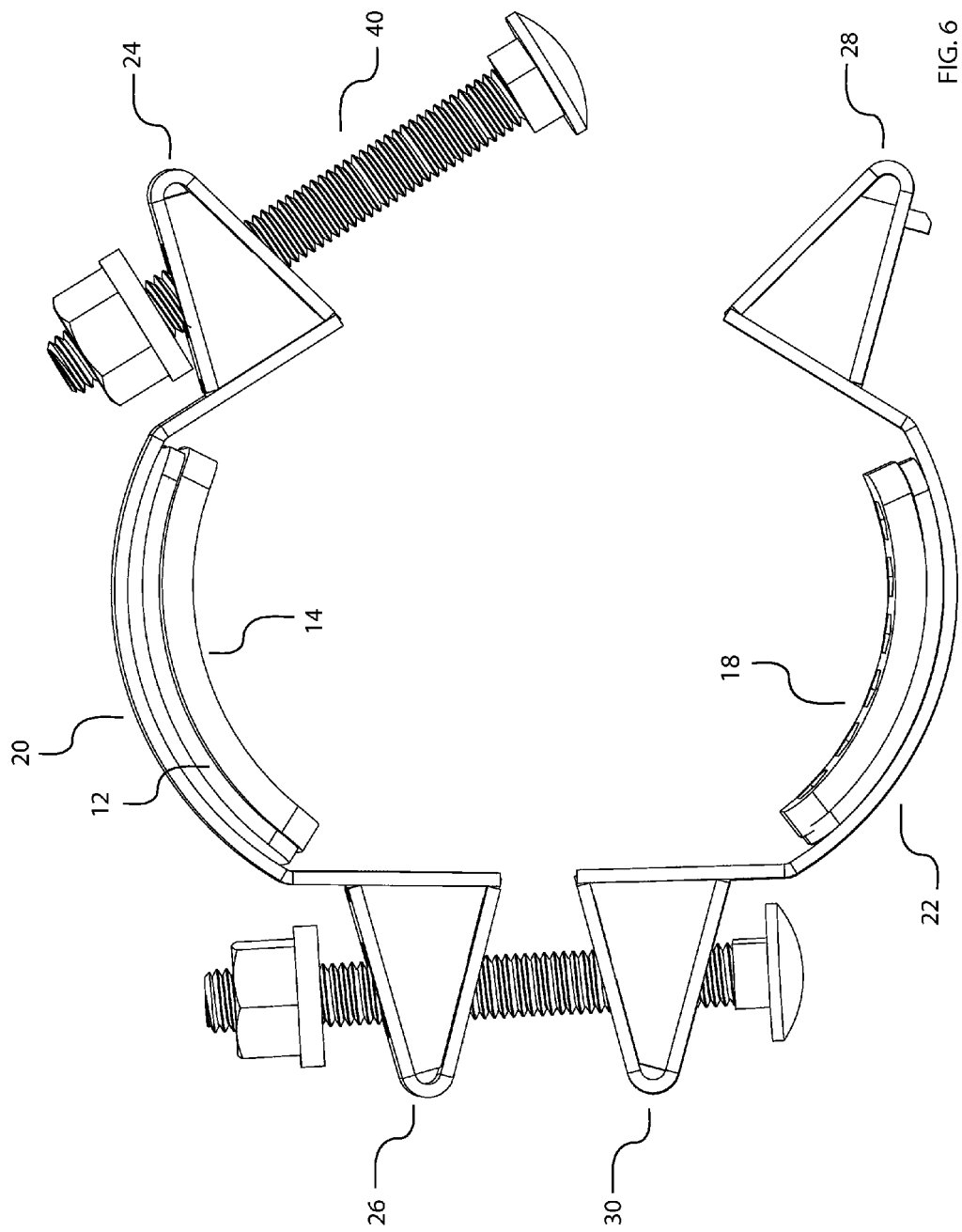
FIG. 6 shows a front/back view of an embodiment of the disclosed device in an open position, prior to installation on a pipe fitting.

As an example of installing the apparatus on a fitting 100, in preparation a fastener retaining block 26 of one band 20 may be placed in facing relation with a corresponding fastener retaining block 30 of the other band 22, with the apertures 34, 38 of each fastener retaining block in general alignment by the insertion of fastener 42 within the apertures 34, 38. In this configuration, as illustrated in FIGS. 5-6, without the nut 48 being overly tightened and thus allowing relative movement between the respective bands 20, 22, the device 10 may be placed around fitting 100 by separating fastener blocks 24, 28 and slipping the apparatus around the fitting. Once the device 10 is placed around the fitting 100, fastener 42 may be pivoted into place, with pan head 48 being sufficiently large to prevent fastener 40 from pulling through slot 44. Once nuts 46, 48 are tightened to the correct torque, the apparatus 10 is securely attached to the fitting 100. This installation method allows a single person to attach the apparatus 10 to a fitting 100.

When the bands 20, 22 are thus attached together with fasteners 40, 42, an enclosing structure is defined which fits around the pipe fitting 100. It is to be appreciated that while the figures depict the pipe fitting 100 in isolation, actual installation of the disclosed apparatus occurs when the fitting is part of a pipeline, in which the pipe fitting 100 may be oriented in any position. The above described installation method nevertheless allows a single person to install the apparatus on the fitting 100, because the device can be held with one hand and fastener 40 pivoted into place with the second hand.

FIGS. 12-19 show another embodiment 110 of the present invention which utilizes a different mechanism for attaching the device to a fitting 100'. This embodiment is particularly adapted for smaller sizes of pipe fittings, such as 2 inch diameter fittings, which provide a limited amount of space for attaching the inside reinforcement member 116 within the concave portion of fitting 100'. This embodiment does not use a separate band and plate design. In this embodiment outside reinforcement member 112 compresses sealing member 114 against a portion of the outside convex surface of the elbow 100', where the outside reinforcement member 112 and sealing member 114 generally have a shape corresponding to the shape of the outside surface of the fitting 100'. Likewise, inside reinforcement member 116 urges sealing member 118 against the a portion of the outside concave surface of the elbow 100'. As shown in FIGS. 15-19, when utilized together, the outside reinforcement member 112 and the inside reinforcement member 116 and the respective bolts 140, 142 encircle the girth of the fitting 100' to be repaired, with each reinforcement member 112, 116 urging its respective sealing member 114, 118 against the exterior surface of the fitting 100', with nuts 148 securing bolts 140, 142 to the respective reinforcement members. In this configuration, the reinforcement members 112, 116 each reinforce one another, and further supporting the fitting 100'.

While the above is a description of various embodiments of the present invention, further modifications may be employed without departing from the spirit and scope of the present invention. Thus the scope of the invention should not be limited according to these factors, but according to the following appended claims.

What is claimed is:

1. In a piping system having at least one ell fitting, the ell fitting having an convex side defined by a first radius and a concave side defined by a second radius, a repair apparatus for the ell fitting comprises:
   a first arcuate reinforcement member having a radius generally corresponding to the first radius, the first arcuate reinforcement member urging a first sealing member in sealing contact against a first portion of the convex side;
   a second arcuate reinforcement member having a radius corresponding to the second radius, the second arcuate reinforcement member urging a second sealing member in sealing contact against a first portion of the concave side; and
   a first band attached to the first arcuate reinforcement member for securing the first arcuate reinforcement member to the convex side and a second band attached to the second arcuate reinforcement member for securing the second arcuate reinforcement member to the concave side wherein the first band and the second band apply a first load to the first arcuate reinforcement member and to the second arcuate reinforcement member, wherein the first load compresses the first portion of the convex side and the first portion of the concave side between the first arcuate reinforcement member and the second arcuate reinforcement member without the first arcuate reinforcement member coming into contact with the second arcuate reinforcement;
   wherein the first band comprises a first triangular shaped fastener retainer structure and the second band comprises a second triangular shaped fastener retainer structure, and a fastener is disposed between the first triangular shaped fastener retainer structure and the second triangular shaped fastener retainer structure wherein each triangular shaped structure comprises apertures in general facing relation for disposition of the fastener wherein at least one of the apertures comprises a slot by which a head of a fastener may be laterally inserted into the aperture, and the slot is bounded to each side by a tab member, each tab member coaxially aligned with the fastener, the tab members collectively capturing the head of the fastener within the slot when the head of the fastener is laterally inserted into the aperture.

2. The repair apparatus of claim 1 wherein the first seal member and the second seal member comprise a gridded surface.

3. In a piping system having at least one ell fitting, the ell fitting having an convex side defined by a first radius and a concave side defined by a second radius, a method of repairing a weakness or rupture in the ell fitting comprises:
   urging a first arcuate reinforcement member against a sealing member, the sealing member disposed in contact against the weakness or rupture, the arcuate reinforcement member having a first length and a first width, wherein a long radius is defined along the first length corresponding to the radius of curvature of the ell fitting and a short radius is defined along the first width;
   disposing a second arcuate reinforcement member on an opposite side of the ell fitting to the first arcuate reinforcement member; and
   attaching the first arcuate reinforcement member and the second arcuate reinforcement member to the ell fitting with a first band attached to the first arcuate reinforcement member for securing the first arcuate reinforcement member to the convex side and a second band attached to the second arcuate reinforcement member, wherein the first band and the second band apply a first load to the first arcuate reinforcement member and to the second arcuate reinforcement member, wherein the first load compresses the first portion of the convex side and the first portion of the concave side between the first arcuate reinforcement member and the second arcuate reinforcement member without the first arcuate reinforcement member coming into contact with the second arcuate reinforcement member wherein the first band comprises a first triangular shaped fastener retainer structure and the second band comprises a second triangular shaped fastener retainer structure, and a fastener is disposed between the first triangular shaped fastener retainer structure and the second triangular shaped fastener retainer structure wherein each triangular shaped structure comprises apertures in general facing relation for disposition of the fastener wherein at least one of the apertures comprises a slot by which a head of a fastener may be laterally inserted into the aperture, and the slot is bounded to each side by a tab member, each tab member coaxially aligned with the fastener, the tab members collectively capturing the head of the fastener within the slot when the head of the fastener is laterally inserted into the aperture.

4. The method of claim 3 wherein the apertures have an elliptical cross-section.

5. The method of claim 3 wherein the first seal member comprises a gridded surface.

* * * * *